United States Patent Office.

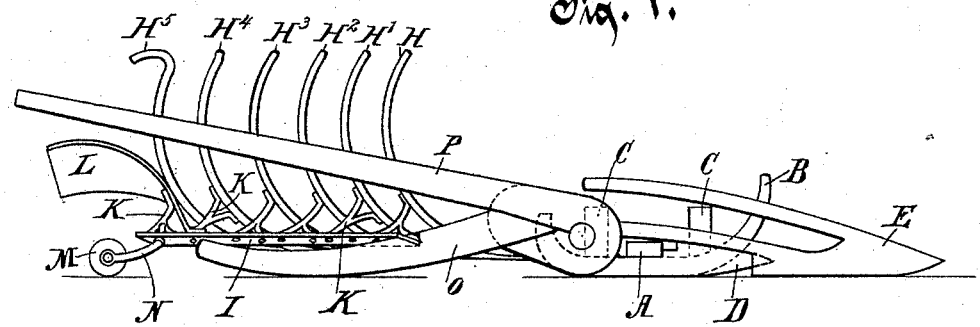
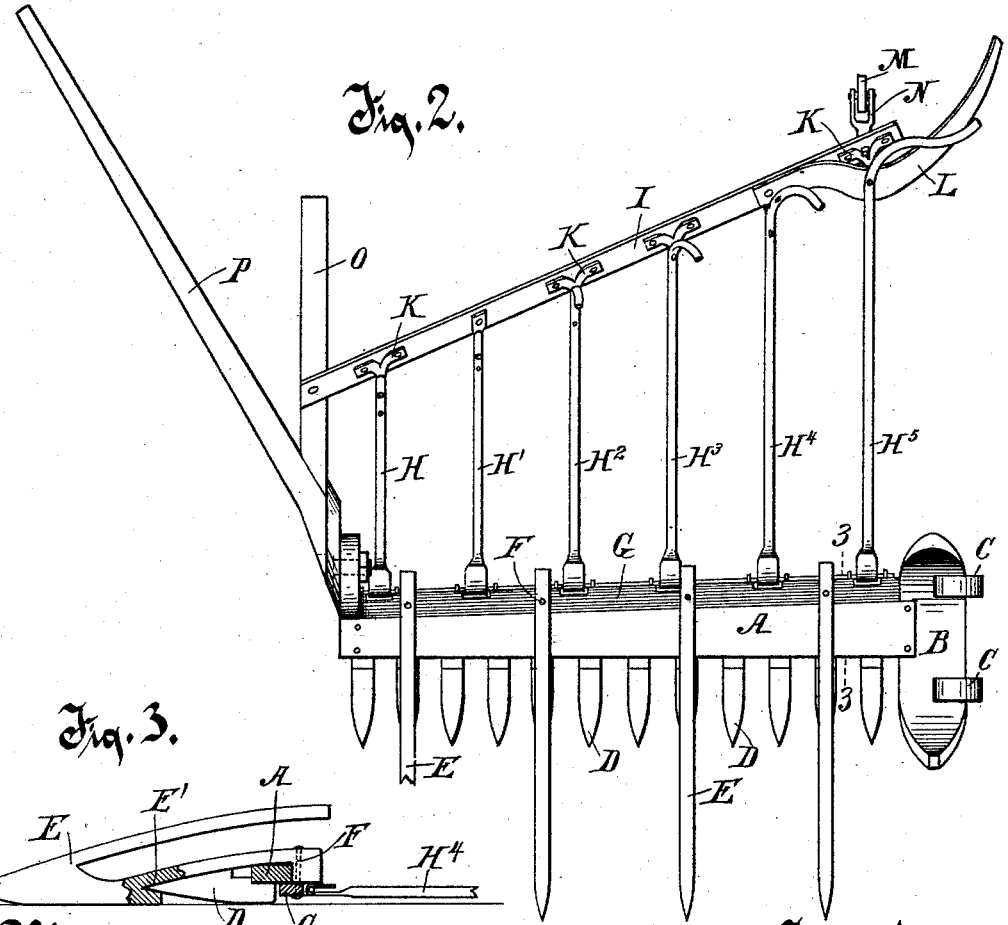

JOHN STEPHANI, OF MANITOWOC, WISCONSIN.

MOWER.

SPECIFICATION forming part of Letters Patent No. 524,491, dated August 14, 1894.

Application filed November 6, 1893. Serial No. 490,093. (No model.)

*To all whom it may concern:*

Be it known that I, JOHN STEPHANI, of Manitowoc, in the county of Manitowoc and State of Wisconsin, have invented a new and useful Improvement in Mowers, of which the following is a description, reference being had to the accompanying drawings, which are a part of this specification.

My invention relates to improvements in the mower for which Patent No. 475,823 was issued to me on May 31, 1892. The mower, is provided with devices for gathering pea vines, and the object of the present invention is to provide means for automatically discharging the gathered pea vines from the machine as it is hauled along.

The invention consists in the apparatus and its parts, as hereinafter described and claimed, or their equivalents.

In the drawings, Figure 1, is an elevation of the finger bar of the mower and of the gathering devices, as seen at the outer end of the finger bar. Fig. 2, is a top plan view of the finger bar of the mower and of the gathering devices. Fig. 3, is a detail, in section on line 3—3 of Fig. 2 looking toward the left.

My improved devices are adapted to be attached to the finger bar of almost any mower of the forms in common use for cutting grass. In the drawings I have shown a finger bar of one of the many forms in use which form is well adapted for attaching my improved vine-gathering and discharging devices thereto.

The finger bar is provided at its inner end with a shoe B having ears C, in and by which ears the finger bar is conveniently hinged to the mower frame. Also the finger bar is provided with knife guides D D, and there are other fingers or guards E E adapted to separate the pea vines and carry them over the finger bar, which guards are also so constructed as to be the means of securing the pea-gathering devices to the finger bar. These guards are each provided with a recess E', adapted to receive therein the point of a knife guide D, and extend rearwardly therefrom over and beyond the finger bar A, and are secured by bolts F F to a bar G partially underlying the finger bar A at its rear edge.

For the purpose of adapting the machine for cutting, gathering and discharging pea vines, additional devices are attached to the finger bar as follows: A series of substantially parallel fingers H H' $H^2$ $H^3$ $H^4$ and $H^5$ are hooked and thereby hinged to the bar G, and extend at little distances apart rearwardly from the finger bar. These fingers H at their rear ends are turned upwardly and somewhat recurved toward the front, and the inner ones as $H^2$ $H^3$ $H^4$ and $H^5$ are turned and extend laterally in the direction of the inner end of the finger bar. The finger H which is at the outer end of the finger bar A, is the shortest, and the other fingers H', $H^2$, &c., are each in regular order longer than the preceding finger on the outside, so that the recurved rear ends of the fingers form an open oblique channel or chute, inclined rearwardly from a point opposite the outer end of the finger bar and at the rear extremity of the finger H, to a point opposite the inner extremity of the finger bar and at the rear end of the finger $H^5$. These fingers H are connected rigidly together at their rear extremities by the cross bar I secured thereto conveniently by brackets K. A guard L affixed to the cross bar I, projects laterally therefrom beyond the inner finger $H^5$ below the recurved and laterally turned extremity of the finger $H^5$, and is also inclined rearwardly somewhat, so as with the laterally turned extremity of the finger $H^5$ above it, to aid in carrying the pea vines laterally a distance from the upright portion of the finger $H^5$ and away from the supporting wheel M, so that the rope-like mass of pea vines, as it is discharged, will not become entangled in the wheel or be pulled rearwardly against the upright part of the finger, but instead will slide off these laterally and rearwardly turning devices. The fingers H in combination with the cross bar I form at their rear ends a structure or frame, which at its inner end is supported conveniently by a small wheel M mounted in a leg N swiveled in the cross bar I near its extremity. At the other extremity the cross bar I is secured to the arm O of the fender P, which at its front extremity is hinged to the outer end of the finger bar A so as to have vertical movement thereon. The arm O is slightly curved downwardly and trails on the ground behind the outer end of the finger bar A. The fender P projects obliquely rearwardly from the outer end of the finger bar, and is adapted as the mower is hauled forward, to separate the uncut from the cut vines, and push the uncut vines back onto the unmown field.

The cross bar I is disposed substantially horizontally, and is located and attached to the several fingers at or near the initial part of the curve upward of each finger, and as the cross bar is connected to the arm O having vertical movement only on the bar G, which bar G is rigid to the finger bar, the construction is such as to hold the fingers securely in position, parallel with each other and substantially at right angles to the bar G. The cross bar I is located at the rear and lower part of the curve of the fingers, because the load of pea vines gathers and moves laterally in the lower part of the trough or channel formed by the upward curve of the fingers, and the strain that would otherwise displace the fingers laterally, is to be resisted along this low line mostly.

From the foregoing description it will be understood that when the mower is at work, the pea vines being cut by the knives, will as the finger bar moves forward, fall over onto the fingers H, and will be gathered by the recurved rear ends of the fingers H, and by reason of their unequal length forming an oblique trough, will as the machine moves forward be rolled over in the trough and at the same time be carried laterally and discharged from the device at its inner rear end alongside the guard L. This frees the machine of the pea vines automatically so that an attendant is not required for this purpose, and also discharges the vines in a single continuous roll or wind-row.

Having thus described my invention, what I claim, and desire to secure by Letters Patent, is—

1. The combination with a finger bar of a mower, of rearwardly extending and terminally upwardly curved fingers of unequal length, the outer finger being shortest and each succeeding inner finger being longer than the preceding finger outwardly, a cross bar connecting the rear extremities of the fingers rigidly, a wheel mounted in and supporting the inner end of the cross bar and a fender hinged to the outer extremity of the finger bar to which fender the cross bar is affixed, substantially as described.

2. The combination with a finger bar of a mower, of a series of rearwardly extending and terminally upwardly curved fingers of unequal length the outer finger being shortest and each succeeding inner finger being longer than the preceding outer finger the terminal ends of the longer fingers being also turned laterally, an arm O hinged for vertical movement to and projecting rearwardly from the mower bar, a horizontally disposed cross bar located at the line of the initial portion of the curve of the fingers upwardly and attached to the arm O connecting the rear extremities of the fingers rigidly, and a guard L secured to the cross bar and projecting laterally and rearwardly beyond the longest finger, substantially as described.

In testimony whereof I affix my signature in presence of two witnesses.

JOHN STEPHANI.

Witnesses:
WILLIAM HILLS,
JOHN BRACHMAN.